(12) United States Patent
Dreiner et al.

(10) Patent No.: US 10,943,714 B2
(45) Date of Patent: Mar. 9, 2021

(54) CABLE

(71) Applicant: LEONI KABEL GMBH, Nuremberg (DE)

(72) Inventors: Michael Dreiner, Wipperfuerth (DE); Jens Mosebach, Wipperfuerth (DE); Holger Winkelmann, Herdecke (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 16/482,578

(22) PCT Filed: Jan. 12, 2018

(86) PCT No.: PCT/EP2018/050744
§ 371 (c)(1),
(2) Date: Jul. 31, 2019

(87) PCT Pub. No.: WO2018/141530
PCT Pub. Date: Aug. 9, 2018

(65) Prior Publication Data
US 2020/0051715 A1    Feb. 13, 2020

(30) Foreign Application Priority Data

Jan. 31, 2017 (DE) .......................... 10 2017 201 554.3
May 5, 2017 (DE) .......................... 10 2017 207 655.0

(51) Int. Cl.
*H01B 7/02* (2006.01)
*H01B 13/22* (2006.01)
*H01B 7/29* (2006.01)
*H01B 13/00* (2006.01)
*H01B 13/14* (2006.01)

(52) U.S. Cl.
CPC .......... *H01B 13/221* (2013.01); *H01B 7/292* (2013.01); *H01B 13/0016* (2013.01); *H01B 13/148* (2013.01)

(58) Field of Classification Search
CPC . H01B 7/02; H01B 7/04; H01B 7/292; H01B 13/221; H01B 13/0016; H01B 13/148
USPC ............. 174/102 R, 108, 109, 110 R, 113 R, 174/120 R, 121 R
See application file for complete search history.

(56) References Cited

U.S. PATENT DOCUMENTS 3,408,453 A * 10/1968 Shelton, Jr. ............ H01B 13/06
174/258
5,220,133 A   6/1993 Sutherland et al.
(Continued)

FOREIGN PATENT DOCUMENTS

CN    105161203 A    12/2015
EP    2581918 A1     4/2013
(Continued)

*Primary Examiner* — William H. Mayo, III
(74) *Attorney, Agent, or Firm* — Laurence A. Greenberg; Werner H. Stemer; Ralph E. Locher

(57) ABSTRACT

A cable has an outer sheath made from fluoropolymer and a conductor core having several individual elements which are surrounded by an inner sheath which penetrates into an intermediate chamber between the individual elements. A heat resistant film is disposed between the inner sheath and the outer sheath and is formed of a metal layer and a support layer.

14 Claims, 1 Drawing Sheet

(56) References Cited

U.S. PATENT DOCUMENTS

| | | | | |
|---|---|---|---|---|
| 6,469,251 B1* | 10/2002 | Dupuis | ................ | H01B 7/1895 |
| | | | | 174/113 R |
| 2006/0137895 A1* | 6/2006 | Varkey | ................ | H01B 7/0291 |
| | | | | 174/113 R |
| 2006/0231286 A1* | 10/2006 | Varkey | ................ | H01B 7/1895 |
| | | | | 174/113 R |
| 2007/0000682 A1* | 1/2007 | Varkey | ................... | H01B 7/046 |
| | | | | 174/102 R |
| 2007/0044991 A1* | 3/2007 | Varkey | ................... | H01B 7/046 |
| | | | | 174/102 R |
| 2008/0302556 A1* | 12/2008 | Varkey | ................... | H01B 7/292 |
| | | | | 174/120 R |
| 2010/0240312 A1* | 9/2010 | Peng | ................... | H04W 72/02 |
| | | | | 455/63.1 |
| 2012/0222869 A1* | 9/2012 | Varkey | ................... | E21B 23/14 |
| | | | | 166/385 |

FOREIGN PATENT DOCUMENTS

| | | | |
|---|---|---|---|
| WO | 2006070314 | A1 | 7/2006 |
| WO | 2011156659 | A2 | 12/2011 |

\* cited by examiner

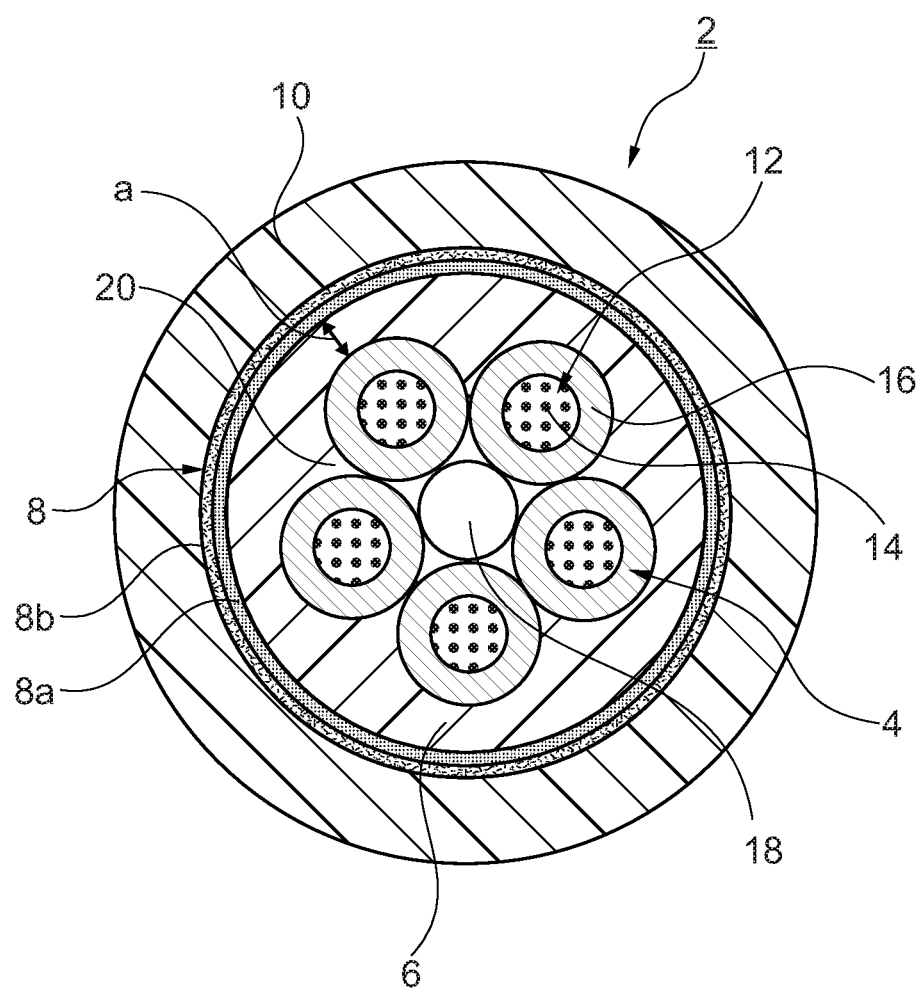

CABLE

BACKGROUND OF THE INVENTION

Field of the Invention

The invention relates to a cable.

Cables, especially those designated as industrial cables that are used in the industrial sector and, for example, are exposed to aggressive media or have to withstand high temperature loads, often have an outer sheath made of a fluoropolymer.

In the case of such cables that have a fluoropolymer outer sheath, however, it is difficult to establish a reliably tight connection between the outer sheath and a connector housing, because typically it is not possible to create a fluid connection between the outer sheath and the connector housing by fusion. Usually, to achieve a reliable seal between the outer sheath and the connector housing, crimp connections are used in which the connector housing is crimped or sprayed onto the outer sheath, and in this way, a certain plastic deformation of the outer sheath occurs. To achieve reliable sealing and tightness, in this case, it is essential that the outer sheath should be designed to be as round as possible.

SUMMARY OF THE INVENTION

Against this background, the object of the invention is to provide a cable that has a fluoropolymer outer sheath and ensures the highest possible roundness.

This object is achieved according to the invention by a cable with an outer sheath made of a fluoropolymer with a conductor core, the conductor core consisting of one or a plurality of individual elements and being surrounded by an inner sheath that penetrates into intermediate chambers between the individual elements, and preferably fills these intermediate chambers completely.

This configuration is based on the consideration that the stranded individual elements of the conductor core, which are stranded together for example, define a non-round outer contour which, in the case of conventional cables, is also at least partially apparent on the outside of the outer sheath and thus contributes to a certain non-roundness.

The inner sheath, which is applied to the conductor core, and also at least partially penetrates into the intermediate chambers formed between the individual elements on the outer circumference of the conductor core and preferably completely fills these chambers, ensures that the inner sheath has a circular geometry. The fluoropolymer outer sheath is applied to this round inner sheath in particular by extrusion, in order to achieve the desired roundness.

References to the inner sheath penetrating at least partially into the spaces between the individual elements mean that the inside of the inner sheath does not have a circular cross-sectional geometry, but rather has radially inwardly projecting bulges that penetrate into the intermediate chambers between the individual elements and preferably fill them almost completely, or also completely. These bulges typically have an approximately triangular geometry with concavely curved edges that are directly adjacent to the (round) individual elements. The inner sheath is therefore generally a solid inner sheath, which is accordingly not designed as a simple hose.

In principle, filling strands may be inserted in the intermediate chambers, also referred to as interstitial areas, to improve the roundness; preferably, however, such filling strands are omitted in the intermediate or interstitial areas.

The term "fluoropolymer outer sheath" generally signifies that the outer sheath consists of a material that is at least mostly fluoropolymer. The fluoropolymer content is preferably >50 wt %, in particular >90 wt %. In particular, the outer sheath consists entirely of a fluoropolymer.

Such a fluoropolymer outer sheath is typically applied by extrusion. This requires very high temperatures that are often above 300°. Especially during extrusion, temperatures are reached in the range of 380° to 400° (known as "hot extrusion").

Alternatively, the outer sheath is formed by a banding, especially a PTFE banding, preferably with subsequent temperature treatment, in particular sintering. The (PTFE) banding is preferably sintered at temperatures of >400° C., preferably also >500° C.

However, these high temperatures may lead to outgassing from the material of the inner sheath. In this case, gas bubbles would form when applying the fluoropolymer outer sheath; these bubbles cannot penetrate to the outside due to the outer sheath having been applied; instead, they are closed in by the outer sheath. Depending on the circumstances, this may result in local bulges on the outside of the outer sheath, which would again degrade roundness.

In this context, in an expedient configuration, a heat-resistant film is arranged between the inner sheath and outer sheath. This film preferably has two functions. First, it prevents any gas bubbles that may occur from being able to penetrate to the outside; and second, it reduces the temperature load on the inner sheath so that outgassing is at least largely avoided.

Accordingly, in an expedient configuration, the film is a dense barrier layer. The film is generally either wound helically around the inner sheath or arranged longitudinally. It is preferably wrapped around the inner sheath. In this case, an overlap is respectively formed between two winding sections following each other in the longitudinal direction, so that the film tightly surrounds the inner sheath.

The film is preferably designed as a heat shield. The film has at least one metal layer for this purpose. The metal layer effectively reduces the temperature load on the inner sheath. According to a first variant, in this case, the film is designed as a metal film.

In a preferred configuration, however, the film is a metal-laminated polymer film having a support layer of a preferably heat-resistant polymer, to which metallization is applied.

The support layer is in particular a polyimide layer. Advantageously, such a metal-laminated polyimide film is particularly suitable as a heat shield.

References to a "film" herein signify that the film typically has a thickness of 20 µm to 50 µm or up to a maximum of several hundred µm.

References to a "heat-resistant film" herein signify that the film will withstand the temperature load during hot extrusion of the fluoropolymer outer sheath, at least while the outer sheath is being applied during the extrusion. This signifies that the film retains its properties as a dense barrier layer and/or heat shield, and is not destroyed.

So that the inner sheath may withstand the remaining temperature load, the inner sheath likewise consists of a heat-resistant polymer. This signifies that the polymer used is heat-resistant to at least 100° C. and preferably to at least 150° C. This signifies that a softening point, melting temperature or decomposition temperature of the material of the inner sheath is preferably above 150° C.

Expediently, for this purpose, the inner sheath is designed as a silicone inner sheath. Accordingly, a silicone polymer is used as the material for the inner sheath. A "silicone inner sheath" signifies that the inner sheath consists mostly of a silicone polymer. In particular, the inner sheath consists of at least 50 wt %, preferably at least 90 wt %, of a silicone polymer. In particular, the inner sheath consists of 100% silicone polymer.

Such a structure of the cable with
the conductor core with a plurality of individual elements stranded together, for example,
the silicone inner sheath directly attached to the conductor core,
the film directly applied thereto, and
the fluoropolymer outer sheath directly attached to the cable, has proven particularly suitable for imparting a high degree of roundness to the cable.

One or a plurality of the following fluoropolymers is preferably selected as a fluoropolymer for the outer sheath:
PFA (perfluoroalkoxy polymer),
PTFE (polytetrafluoroethylene),
FEP (tetrafluoroethylene-hexafluoropropylene copolymer),
ETFE (ethylene tetrafluoroethylene)
MFA (perfluoroalkoxy polymer), Preferably, a compound of one of the fluoropolymers mentioned above, in particular a compound of ETFE with a fluoroelastomer, is used as the material for the intermediate sheath. Adding a fluoroelastomer provides good (bending) flexibility. The proportion of fluoroelastomer is preferably in the range of 40 to 50 wt %. Expediently, the cable is also made up of the conductor core, inner sheath, heat-resistant film and outer sheath components, in that order, respectively concentrically surrounding each other.

The conductor core consists again preferably only of a plurality of cores, that are for example stranded together. If necessary, additional filling strands may optionally be furnished. In particular, if necessary, a central filling strand is furnished, around which the cores are stranded. The cores are optionally signal cores for transmitting data signals and/or supply cores for transmitting electrical power, i.e. for supplying electrical components with electrical energy. In principle, there is also the possibility that, in addition to these cores, other individual elements may be arranged, such as for example light guide elements (optical fibers) or hoses, etc.

The diameter of such cables, especially those intended for use as industrial cables, typically ranges from a few millimeters to a maximum of a few tens of millimeters. For example, the outer diameter of the outer sheath is 2 mm to 30 mm. However, the cable structure described herein is not limited to such diameter ranges.

BRIEF DESCRIPTION OF THE DRAWING

An exemplary embodiment of the invention is explained in greater detail below using the single drawing. This drawing shows a cross-section of a cable.

DESCRIPTION OF THE INVENTION

The cable 2 shown in the drawing has a conductor core 4 that an inner sheath 6 directly surrounds. A heat-resistant film 8 is applied, and in particular wrapped, around the inner sheath 6. A fluoropolymer outer sheath 10 is fitted around this film. This outer sheath is extruded by hot extrusion, in particular tube extrusion, onto the inner sheath 6 that has been wrapped with film 8.

The conductor core 4 has a plurality of individual elements 12. These elements are in particular cores, in particular stranded conductors, that are each respectively made up of a central conductor 14 and a core insulation 16 that surrounds them. In the exemplary embodiment, a total of 5 individual elements 12 are furnished that are formed as cores. By way of example, these are stranded together and form a common layer. An additional strand is arranged in the center, for example a filling strand 18; the individual elements 12, which are formed as cores, are stranded around it.

Due to the circular cross-section of the cores, an interstitial intermediate area 20 is respectively formed between each two adjacent cores. Expediently, this intermediate area is completely filled with the material of the inner sheath 6.

The inner sheath 6 is in this case a silicone inner sheath. A silicone polymer is therefore used as the material for the inner sheath 6. The inner sheath consists at least mostly of a silicone polymer; preferably, the inner sheath 6 consists entirely of a silicone polymer.

As may also be seen from the drawing, the inner sheath completely surrounds the conductor core 4, so that the outer sheath 10 and also the film 8 have a minimum distance a to the individual elements 12, this distance for example being at least 0.3 mm or preferably at least 0.8 mm.

The film 8 is in particular a metal-laminated film 6 that has a support layer 8a made especially of a polyimide, and a metal layer 8b applied thereto that is in particular an aluminum layer. In this case, the metal layer 8b is in particular oriented outward toward the outer sheath 10.

Preferably, a compound of one of the fluoropolymers mentioned above, in particular a compound of ETFE with a fluoroelastomer, is used as the material for the intermediate sheath. Adding a fluoroelastomer provides good (bending) flexibility. As a result, the cable 2 has a high bending flexibility overall. "Fluoroelastomers" refer generally to fluorinated elastomers, which are also known under the term fluororubber. For example, the material used for the intermediate sheath 8 is sold under the trade name Fluon AR-8018A (Fluon is a trademark of Asahi Glass Company, Ltd.).

The outer diameter of the cable 2 and thus of the outer sheath 10 usually ranges between 2 mm and 30 mm. The outer sheath 10 has a wall thickness that is for example greater than the minimum distance a. The wall thickness of the outer sheath 10 is for example in a range from 0.3 mm to 2 mm. The minimum distance a of the inner sheath 6 is preferably in the range from 0.3 mm to 2 mm. Furthermore, the conductor core 4 has a diameter that is determined by a circle that envelops one of the individual elements 12. In this case, this diameter is preferably in the range from 1 mm to 30 mm.

The cable 2 is characterized by a high degree of roundness due to its structure. Because a fluoropolymer outer sheath 10 is used, the cable also exhibits good heat resistance and very good media resistance, for example to oils or other media. This makes the cable particularly suitable for use as an industrial cable in industrial applications, even under harsh environmental conditions.

In manufacturing the cable 2, the inner sheath 6 is first applied to the individual elements 12, which have been stranded together beforehand, for example by extrusion. The film 8 is then applied, in particular wrapped, around the inner sheath 6. The fluoropolymer outer sheath 10 is then applied by tube extrusion. This occurs by means of hot extrusion at temperatures that are typically between 380° C.

and 400° C. Alternatively, to form the outer sheath 10, a PTFE banding is applied and later sintered at temperatures of >400° C.

The invention claimed is:

1. A cable, comprising:
an inner sheath;
an outer sheath made of a fluoropolymer and surrounding said inner sheath;
a conductor core having a plurality of individual elements and being surrounded by said inner sheath which penetrates into intermediate chambers formed between said individual elements;
a heat-resistant film disposed between said inner sheath and said outer sheath;
said heat-resistant film being a heat shield having at least one metal layer; and
said outer sheath and said heat-resistant film having a minimum distance to said individual elements, said minimum distance being at least 0.3 mm.

2. The cable according to claim 1, wherein said heat-resistant film is a dense barrier layer.

3. The cable according to claim 1, wherein said heat-resistant film is a metal-laminated polymer film having a support layer of a heat-resistant polymer.

4. The cable according to claim 3, wherein said support layer is formed from a polyimide.

5. The cable according to claim 1, wherein said inner sheath contains a polymer that is heat-resistant to at least 100° C.

6. The cable according to claim 1, wherein said inner sheath is configured as a silicone inner sheath.

7. The cable according to claim 1, wherein said fluoropolymer contains a material selected from the group consisting of perfluoroalkoxy polymer (PFA), polytetrafluoroethylene (PTFE), tetrafluoroethylene-hexafluoropropylene copolymer (FEP), perfluoroalkoxy polymer (MFA) and ethylene-tetrafluoroethylene (ETFE).

8. The cable according to claim 7, wherein said outer sheath is formed from a compound of said fluoropolymer and a fluoroelastomer.

9. The cable according to claim 1, wherein the cable has a structure with the following components in immediate succession: said conductor core, said inner sheath, said heat-resistant film and said outer sheath.

10. The cable according to claim 1, wherein said conductor core contains only said individual elements being a plurality of electrical cores.

11. The cable according to claim 10, wherein said conductor core contains said individual elements being a plurality of electrical cores surrounding a central filling strand.

12. The cable according to claim 1, wherein said inner sheath contains a polymer that is heat-resistant to at least 150° C.

13. The cable according to claim 1, wherein said heat-resistant film is a metal-laminated polymer film having a support layer of a heat-resistant polymer, wherein said support layer is formed from a polyimide and said metal layer is oriented outwardly towards said outer sheath.

14. A cable, comprising:
an inner sheath;
an outer sheath surrounding said inner sheath;
a conductor core having a plurality of individual elements and being surrounded by said inner sheath which penetrates into intermediate chambers formed between said individual elements;
a heat-resistant film disposed between said inner sheath and said outer sheath;
said heat-resistant film being a heat shield having at least one metal layer; and
said outer sheath and said heat-resistant film having a minimum distance to said individual elements, said minimum distance being at least 0.3 mm;
said fluoropolymer containing a material selected from the group consisting of perfluoroalkoxy polymer (PFA), polytetrafluoroethylene (PTFE), tetrafluoro-ethylene-hexafluoropropylene copolymer (FEP), perfluoroalkoxy polymer (MFA), and ethylene-tetrafluoroethylene (ETFE); and
said outer sheath being formed from a compound of said fluoropolymer and a fluoroelastomer.

* * * * *